C. P. ROSS.
CONVEYER.
APPLICATION FILED FEB. 1, 1916.
1,322,469.
Patented Nov. 18, 1919.
2 SHEETS—SHEET 1.
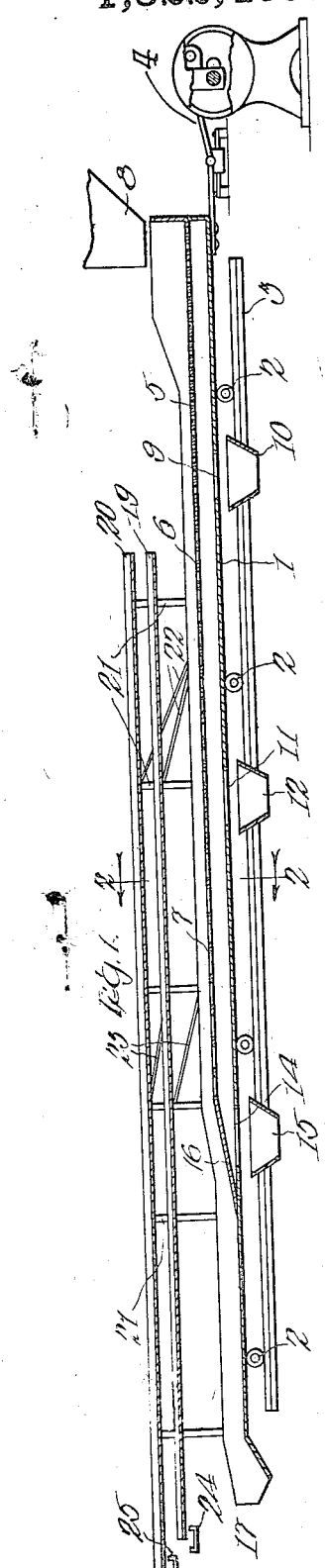
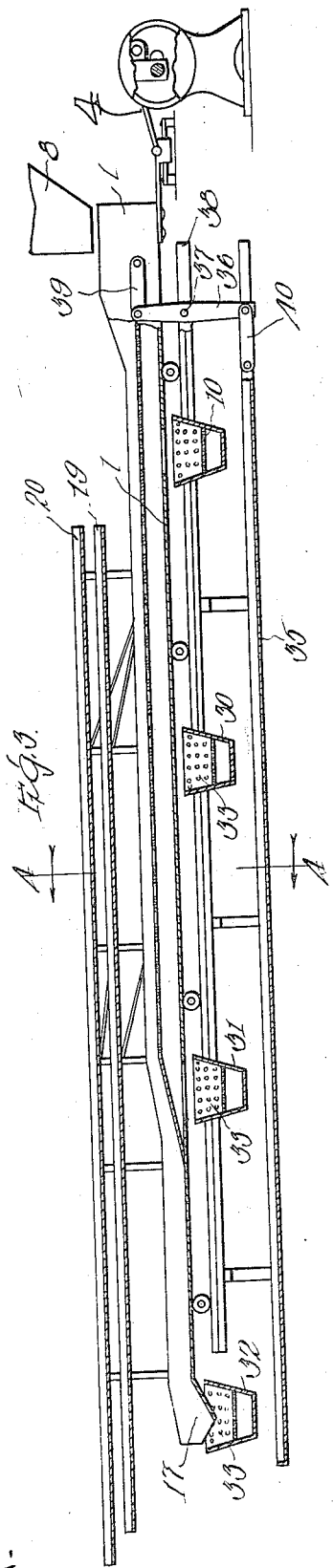
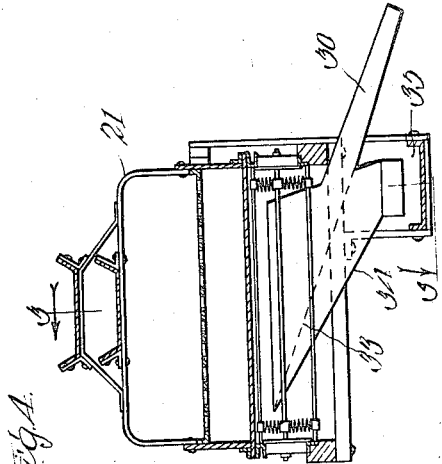
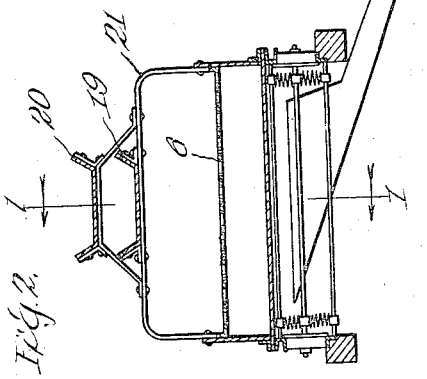

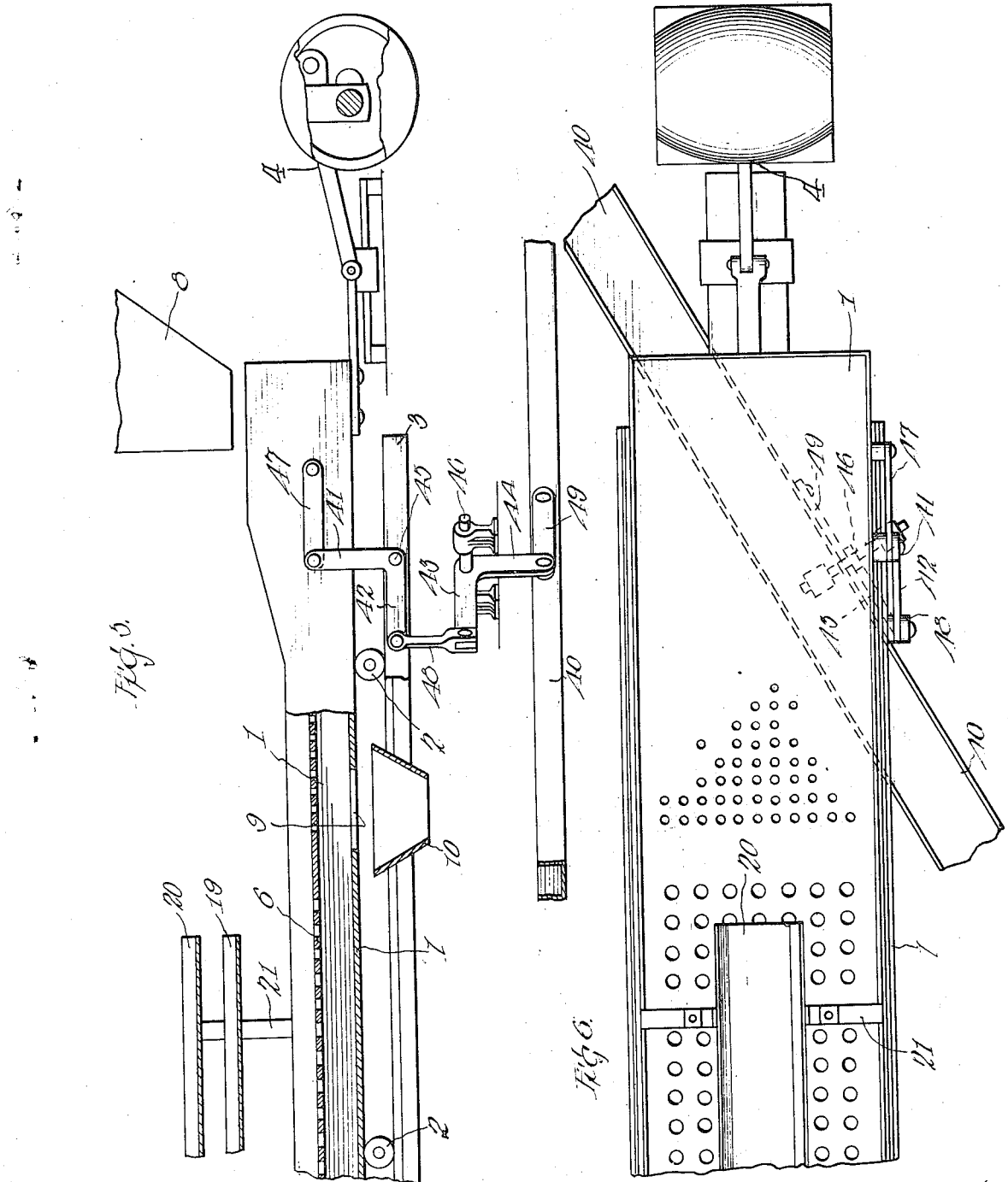

UNITED STATES PATENT OFFICE.

CLYDE P. ROSS, OF CHICAGO, ILLINOIS, ASSIGNOR TO ROBERTS AND SCHAEFER COMPANY, OF CHICAGO, ILLINOIS, A CORPORATION OF ILLINOIS.

CONVEYER.

1,322,469.  Specification of Letters Patent.  Patented Nov. 18, 1919.

Application filed February 1, 1916. Serial No. 75,514.

*To all whom it may concern:*

Be it known that I, CLYDE P. ROSS, a citizen of the United States, residing at Chicago, in the county of Cook and State of Illinois, have invented certain new and useful Improvements in Conveyers, of which the following is a description.

My invention relates to means for moving coal, gravel or other material in a substantially horizontal direction.

The object of my invention is to provide a simple, convenient, cheap, durable and absolutely reliable device of the kind described wherein material passing along the main conveyer may be sorted and the several selections of material carried away independently and discharged at more or less remote points.

To this end my invention consists in the novel construction, arrangement and combination of parts herein shown and described, and more particularly pointed out in the claims.

In the accompanying drawings wherein like or similar reference characters indicate like or corresponding parts:

Figure 1 is a central vertical longitudinal section of my improved conveyer taken substantially on line 1—1 of Fig. 2.

Fig. 2 is a transverse section taken substantially on line 2—2 of Fig. 1.

Fig. 3 is a section taken substantially on line 3—3 of Fig. 4 showing a conveyer similar to that shown in Fig. 1 but having the return trough below the main conveyer.

Fig. 4 is a transverse section taken substantially on line 4—4 of Fig. 3.

Fig. 5 is a side elevation of my device with parts removed and broken away to more clearly show the construction.

Fig. 6 is a plan view of the mechanism shown in Fig. 5.

In the form shown in the drawings 1 is the main conveyer trough mounted on suitable wheels or rollers 2—2 or other convenient means to support the body or carrying surface of the conveyer trough substantially parallel to the track 3. Suitable mechanism is also provided as at 4 for imparting a variable oscillatory movement to the conveyer trough 1 to produce the desired progressive movement of the material in the trough. In the preferred form suitable screens 5, 6 and 7 are also provided in the trough 1 substantially parallel with its bottom so that material entering the trough from the hopper 8 will first pass over the screens and will be sorted for size. The finest material will pass through the screen 5 on to the adjacent bottom of the trough and escape through the opening 9 into the hopper 10, the next coarser material will pass through the screen 6 onto the bottom of the trough and escape through the opening 11 into the hopper 12 and the next coarser material will pass through the screen 7 onto the bottom of the trough and escape through the opening 14 into the hopper 15 while all that is too coarse to pass through the screen 7 will pass over the slide 16 onto the bottom of the trough and escape at the discharge end 17 of the trough.

During this sorting operation it is frequently desirable to manually select any desired material from the mass as it passes over the screen or along the trough to separate the same from the remainder of the material, for example, when coal is being screened it is desirable to remove the slate and other refuse material and convey the same to a refuse dump, while in case valuable mineral substances are found in the coal it may also be removed by hand and carried to a suitable box or hopper to receive the same and provided for its independent disposition. For this purpose I provide any desired number of auxiliary troughs 19 and 20 immediately above and substantially parallel to the main trough 1 and rigidly secured thereto by suitable frames or brackets 21—21 adapted to rigidly support the auxiliary troughs in position while suitable braces 22 an 23 are provided to coöperate with the brackets 21 to rigidly connect the auxiliary troughs to the main trough and prevent independent longitudinal movement between them. When thus constructed it is obvious that the movements of the main trough 1 will be communicated to the auxiliary troughs 19 and 20 so that material will travel along each of the auxiliary troughs in the same direction and at substantially the same speed as in the main trough 1 and that by providing suitable inclined chutes or troughs 24 and 25 at the discharge ends of the auxiliary troughs the material carried by them may be spouted into any desired receptacles.

In the form shown in Fig. 3 the several parts are arranged substantially as hereinbefore described except that the spouts 30 and 31 are each provided with a screen section 33 near their upper end so that in case the material discharged into either of these spouts has been broken in its movement along the bottom of the conveyer as it passes over the screen 33 the broken or finer parts will pass through into the hopper 34 arranged immediately below the same and thence by gravity into an auxiliary conveyer 35. A spout 32 also provided with a screen section 33 is provided to receive the material passing the discharge end 17 of the main conveyer so that any fine material finding its way into any of the chutes will escape into the auxiliary trough 35 and be carried back to the trough 10.

Any suitable means may be provided for connecting the trough 35 to the conveyer 1 to operate the same to move material in a direction opposite to that in the main conveyer 1. As shown an arm 36 is pivotally mounted as at 37 upon the main track 38 for the main conveyer. The upper end of the arm 36 is connected by a link 39 to the main trough 1 while the lower end is connected by a similar link 40 to the auxiliary conveyer or trough 35, thus imparting movement from the main trough to the auxiliary trough in the opposite direction but otherwise substantially the same as the main trough, thus moving the material in the auxiliary trough 35 in a direction opposite to the material in the main trough.

In the form shown in Figs. 4 and 5 an auxiliary trough 40 is provided extending at an angle to the main trough 1 and connected thereto by a pair of bell-cranks 41—42 and 43—44 each pivotally mounted upon the frame work as at 45 and 46 respectively. A link 47 connects the arm 41 of the bell crank 41—42 to the main trough 1. A link 48 connects the arms 42 and 43 of the two bell-cranks and a link 49 connects the arm 44 of the bell-crank 43—44 to the auxiliary trough 40 thus communicating the longitudinal movement of the main trough 1 to the auxiliary trough which obviously may be arranged at any desired angle to the main trough 1.

While in the foregoing I have particularly described an application of my improvement to mechanism for handling coal, it is obvious that substantially the same general principles may be employed with slight modifications for handling many substances and that the auxiliary troughs 19, 20, 35 and 40 may be arranged in any desired relation either above or below the main trough to carry material in any desired direction, hence I do not wish to be understood as limiting myself to the exact form or construction shown.

What I claim as new and desire to secure by Letters Patent is:

1. In a device of the kind described, a longitudinally movable horizontal main trough, means for maintaining the same in a fixed horizontal plane, and means for imparting a variable reciprocating movement thereto parallel to its bottom to move material positioned therein longitudinally thereof, in combination with a plurality of rigidly connected auxiliary troughs supported by and extending substantially parallel to said main trough and means connecting said troughs adapted to communicate a movement to said auxiliary troughs similar to the movement of said main trough to move material in said auxiliary troughs longitudinally thereof.

2. In a device of the kind described, a main trough, means for maintaining the same in a fixed plane, and means for imparting a variable reciprocating movement thereto parallel to its bottom to move material positioned therein longitudinally thereof, in combination with an auxiliary trough mounted upon and extending substantially parallel to said main trough, and means connecting said troughs adapted to communicate a movement to said auxiliary trough similar to the movement of said main trough to move material in said auxiliary trough longitudinally thereof.

3. In a device of the kind described, a substantially horizontal main trough, means for maintaining the same in a fixed horizontal plane, and means for imparting a variable reciprocating movement thereto to move material positioned therein longitudinally thereof, in combination with a plurality of auxiliary troughs each mounted upon and extending substantially parallel to said main trough and means connecting said troughs adapted to communicate movement from said main trough to said auxiliary troughs to move material therein longitudinally thereof.

In testimony whereof, I have hereunto signed my name in the presence of two subscribing witnesses.

CLYDE P. ROSS.

Witnesses:
BURTON U. HILLS,
KATHERINE I. BLADE.